(12) United States Patent
Pires Dos Reis Moreira et al.

(10) Patent No.: US 9,354,930 B2
(45) Date of Patent: May 31, 2016

(54) SCHEDULING OF GLOBAL VOLTAGE/FREQUENCY SCALING SWITCHES AMONG ASYNCHRONOUS DATAFLOW DEPENDENT PROCESSORS

(71) Applicant: Telefonaktiebolaget L M Ericsson (publ), Stockholm (SE)

(72) Inventors: Orlando Pires Dos Reis Moreira, Eindhoven (NL); Cornelis Van Berkel, Heeze (NL)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 235 days.

(21) Appl. No.: 14/250,819

(22) Filed: Apr. 11, 2014

(65) Prior Publication Data
US 2015/0293788 A1    Oct. 15, 2015

(51) Int. Cl.
*G06F 1/32*    (2006.01)
*G06F 9/48*    (2006.01)
*G06F 9/50*    (2006.01)

(52) U.S. Cl.
CPC .............. *G06F 9/4893* (2013.01); *G06F 1/329* (2013.01); *G06F 1/3234* (2013.01); *G06F 9/5094* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 7,111,179 B1 * | 9/2006 | Girson | G06F 1/3203 320/130 |
| 8,566,618 B2 | 10/2013 | Floyd et al. | |
| 2009/0327656 A1 * | 12/2009 | Baum | G06F 1/206 712/43 |
| 2013/0007413 A1 * | 1/2013 | Thomson | G06F 1/324 712/30 |
| 2013/0086402 A1 | 4/2013 | Pires Dos Reis Moreira | |
| 2013/0166924 A1 | 6/2013 | Yang et al. | |

OTHER PUBLICATIONS

Moreira et al. "Throughput-Constrained Voltage and Frequency Scaling for Real-time Heterogeneous Multiprocessors" SAC '13, Mar. 18-22, 2013, Coimbra, Portugal, ACM, 978-1-4503-1656-9/13/03.
Saha, Sonal "An Experimental Evaluation of Real-Time DVFS Scheduling Algorithms" Thesis, Sep. 9, 2011.
Gupta, Nikhil "Energy Efficient Scheduling for Real-Time Systems" Dissertation, Dec. 2011.
PCT International Search Report, issued Jul. 3, 2015 by the European Patent Office for PCT International Application No. PCT/EP2015/057076.

* cited by examiner

*Primary Examiner* — Paul Yanchus, III
(74) *Attorney, Agent, or Firm* — Leffler Ontellectual Property Law, PLLC; Kenneth B. Leffler

(57) ABSTRACT

Task execution among a plurality of processors that are configured to operate concurrently at a same global Voltage/Frequency (VF) level is controlled by using a global power manager to control VF switching from one VF level to another VF level, the same current VF level governing VF settings of each processor. Each of the processors controls whether it will wait for a VF switch from a current VF level to a next VF level prior to enabling execution of a next scheduled task for the one of the processors, with the decision being based on whether a current VF level is higher than the next scheduled VF level. The global power manager performs VF level switching at least based on a timing schedule, and in some but not all embodiments, also on whether all processors indicate that they are waiting for a VF level switch.

12 Claims, 10 Drawing Sheets

SCHEDULING OF GLOBAL VOLTAGE/FREQUENCY SCALING SWITCHES AMONG ASYNCHRONOUS DATAFLOW DEPENDENT PROCESSORS

BACKGROUND

The invention relates to global voltage/frequency switches in a multiprocessor environment, and more particularly to global voltage/frequency switches in an environment having asynchronously operating processors, one or more of which have a task scheduling mechanism that is dataflow dependent on outputs from one or more of the other processors.

Radio transceivers have stringent time requirements, and are commonly treated as hard-real-time applications whose deadlines cannot be missed, and for which there is no graceful degradation of performance.

In recent years, designers have implemented the physical layer (PHY) of modems on heterogeneous multiprocessors. Due to difficulties in synchronization, tasks between processors are neither statically scheduled, nor are they time-triggered. Instead, they synchronize amongst themselves in a distributed, self-timed fashion: when a task finishes execution, it sends a trigger to another task (potentially running on another processor/accelerator) and that task starts execution.

At the same time, so-called Voltage-Frequency Scaling (VFS) technology is becoming more and more popular. This concerns one or multiple switches that allow one or more processor cores to switch between different voltage/frequency levels. Each of these voltage/frequency levels offers a different trade-off between power consumption and performance. Thus, one can run faster and consume more power, or run slower and consume less power. This switching is not limited to two levels, but typically a number of discrete levels.

U.S. Patent Publication 2013/0086402, published on Apr. 4, 2013 by Orlando Pires Dos Reis Moreira and entitled "DFVS-Enabled Multiprocessor" (hereinafter, "Moreira"), which is hereby incorporated herein by reference in its entirety, describes how a computer program designed in accordance with linear programming (LP) technology can be used to generate a static periodic schedule to assign, for each time interval, a different Voltage-Frequency level, in such a way that the temporal requirements of a streaming application described as a dataflow graph annotated with timing are met, while providing optimal (minimal) energy consumption. However, the inventors have recognized that this methodology has two important limitations.

The first is that it relies on the assumption that each processor has an independent VFS switch. In many hardware platforms, a single, global, VFS switch is provided by the hardware. This is mainly due to cost issues. To account for this, a heuristic including (Integer) LP programming has been described that provides a static periodic schedule for a global VFS switch that minimizes energy consumption. See Moreira et al., "Throughput-Constrained Voltage and Frequency Scaling for Real-time Heterogeneous Multiprocessors", *SAC* '13 Mar. 18-22, 2013, Coimbra, Portugal (ACM 978-1-4503-1656-9/13/03) (hereinafter referred to as "Moreira et al."), which is hereby incorporated herein by reference in its entirety.

The second limitation is that a static periodic schedule is very difficult to implement at a system level, because it requires very exact global synchronization for the starting/stopping of each task. As mentioned before, most multiprocessor systems have distributed, self-timed synchronization. For the case assumed in the Moreira publication, this was not really a problem. Since each processor had its own VFS switch, a self-timed implementation of the static schedule (i.e., preserving the order, but scrapping the exact activation times), would always work, as each processor could set its own pace of execution, and its own power consumption level. The cited Moreira et al. publication also assumes that there is a shared VFS switch in the global cases. But in that publication, it is assumed that it is possible to easily statically schedule across all processors, so no care is given to minimizing power consumption for self-timed schedules.

A problem arises, however, in a processing platform with a global switch. Consider the task graph depicted in FIG. 1. A number of recurring tasks, depicted as nodes in the graph, with activation dependencies per iteration as expressed by the directed edges between them (meaning that the source task must terminate its current iteration before the sink task can execute), are to execute on a multiprocessor, in a self-timed manner (i.e., a task fires immediately when its dependencies are met—this is signaled by inter-task, inter-processor synchronization mechanisms, which can differ from one embodiment to the next). Each task can run only on a specific processor (this may be due to a mapping decision or to the existence of a dedicated/specialized processor for a specific task). In this example, the system includes three processors, denoted A, B, and C, respectively. The name of each task is prefixed by an indication of the processor onto which it is mapped. Thus, task A1 maps to processor A, task B2 maps to processor B and so on. In some instances, it may be advantageous to split up a task into two sub-tasks, with each running at a different VFS level. This is denoted by applying the above-described naming convention to the first-run task, and then appending an apostrophe (') to the same task name for the second-run task. For example, in FIG. 1, Tasks A1 and A1' represent the same overall task, with a first part slated to be run at a first VFS level, and the second part slated to be run at a second VFS level.

After applying the algorithm described in the above-cited Moreira et al. publication or another algorithm to obtain a similar VFS schedule, a static periodic schedule for all tasks is obtained, along with a static periodic schedule for the switching between different frequency levels for the global VFS switch. The schedule consists of "segments" of time.

FIG. 2 depicts an ideal static schedule per processor for the exemplary graph of FIG. 1, assuming 2 Voltage-Frequency levels in the switch. Notice that the schedule works under the assumption of worst-case execution times for all tasks, and respects all data dependencies. As shown in the graph, Tasks A1 and B1 are run with a low V/F setting while processor C remains idle (due to task C1's data dependency on the output of task B1. At a timed switch to a high V/F setting (transition from Segment 1 to Segment 2), it is assumed that tasks A1 and B1 have completed. Accordingly, processors A and C run their respective tasks A1' and C1. Processor B is now idle, because its next task, B2, is dependent on completion of both tasks A1' and B1.

In a third switching period (Segment 3), the circuitry switches to a low V/F setting, and tasks A2, B2, and C1' are run. At the end of the Segment 3, the circuitry switches back to a high V/F setting in Segment 4, and task A3 is run on processor A, while processors B and C, which according to the graph of FIG. 1 have no further tasks scheduled, remain idle.

The timing depicted in FIG. 2 is static and based on a global timer with timeout periods set to values that guarantee that the slowest task can run to completion before expiration of the timer. This means that the timing of each task initiation is dictated by the VFS level switching schedule. Now look at what can happen to the same program depicted in FIG. 1 when the execution of tasks is self-timed, but the switching of VFS levels is kept static periodic. In this example, assume that on one iteration, the execution times of tasks A1' and C1 are half of the worst-case execution time. The resulting schedule is depicted in the scheduling graph of FIG. 3. Each task is permitted to run as soon as its data dependencies are satisfied, but the scheduling of the VFS switching is static periodic.

Since the execution is self-timed (i.e., as soon as possible with all data dependencies preserved) and the data flow model of execution is time-monotonic (i.e., faster-than-worst case finishing of a task activation or firing can only result in faster-than-worst case starting of any dependent task activations or firings), all dependencies are preserved. Furthermore, since a faster-than-worst-case finishing of a task can only result in a faster-than-worst-case start of a task (assuming that the new task's other data dependencies (if any) have also been satisfied), and taking into account that the schedule of the VFS switch can only be slower, the only possibility is that tasks will complete faster than required, and never later. Thus, all worst-case temporal requirements are honored.

The problem is that the circuitry is potentially expending much more power than on the static periodic schedule. This is evident from an inspection of FIG. 3. It had been planned to execute tasks A2, B2 and C1' in low power mode (see FIG. 2, Segment 3), but due to the self-timed, as-soon-as-possible implementation of the schedule, most of their cycles are executed (needlessly, since this happens even before these tasks were required to start) at the high frequency/voltage of Segment 2, thus spending more power than required for real time behavior.

It is therefore desired to address the problem of how to schedule a global V/F switch in a way that saves energy consumption on a multiprocessor chip, while also guaranteeing satisfaction of all real-time application timing requirements.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof. Also, as used herein the term "exemplary" means serving as one illustration out of any number of possible illustrations.

In accordance with one aspect of the present invention, the foregoing and other objects are achieved in methods and apparatuses for controlling task execution among a plurality of processors that are configured to operate concurrently at a same global Voltage/Frequency (VF) level. Task execution control includes using a global power manager to control VF switching from one VF level to another VF level, wherein a same current VF level governs VF settings of each of the processors; and each one of the processors controlling whether the one of the processors will wait for a VF switch from a current VF level to a next VF level prior to enabling execution of a next scheduled task for the one of the processors.

In this arrangement, the global power manager performs a VF level switching process that includes controlling a timer so as to cause the timer to generate a timer event at a known future time. Whenever the timer event occurs, the timer event is detected and in response to the detection, a VF switch from a current VF level to a next scheduled VF level is caused to occur.

Also in this arrangement, controlling whether the one of the processors will wait for a VF switch from the current VF level to the next VF level prior to enabling execution of the next scheduled task for the one of the processors includes detecting that the current VF level is higher than the next scheduled VF level. In response to detecting that the current VF level is higher than the next scheduled VF level, the one of the processors is caused to wait for the VF switch from the current VF level to the next VF level prior to enabling execution of the next scheduled tasks of the one of the processors to begin; otherwise execution of the next scheduled tasks of the one of the processors is enabled to begin without waiting for the VF switch from the current VF level to the next VF level.

In some but not necessarily all embodiments, causing the one of the processors to wait for the VF switch from the current VF level to the next VF level prior to enabling execution of the next scheduled tasks of the one of the processors to begin includes causing the one of the processors to wait until the one of the processors detects an occurrence of the timer event.

In some but not necessarily all embodiments, the VF level switching process performed by the global power manager includes detecting that all execution processes of the processors are waiting for the VF switch from the current VF level to the next VF level prior to enabling execution of the next scheduled tasks of the one of the processors to begin, and in response to said detection, causing the VF switch from the current VF level to the next scheduled VF level.

In some but not necessarily all of these embodiments, causing the one of the processors to wait for the VF switch from the current VF level to the next VF level prior to enabling execution of the next scheduled tasks of the one of the processors to begin comprises notifying the global power manager that the one of the processors is waiting for the VF switch from the current VF level to the next VF level prior to enabling execution of the next scheduled tasks of the one of the processors to begin.

In an aspect of some but not necessarily all embodiments, each one of the next scheduled tasks of the one of the processors begins only when execution of said one of the next scheduled tasks has been enabled and when all task specific dependencies of said one of the next scheduled tasks has been satisfied. For example, in some but not necessarily all embodiments the task specific dependencies of the one of the next scheduled tasks comprises task specific data dependencies.

BRIEF DESCRIPTION OF THE DRAWINGS

The objects and advantages of the invention will be understood by reading the following detailed description in conjunction with the drawings in which.

DETAILED DESCRIPTION

Figure 1:
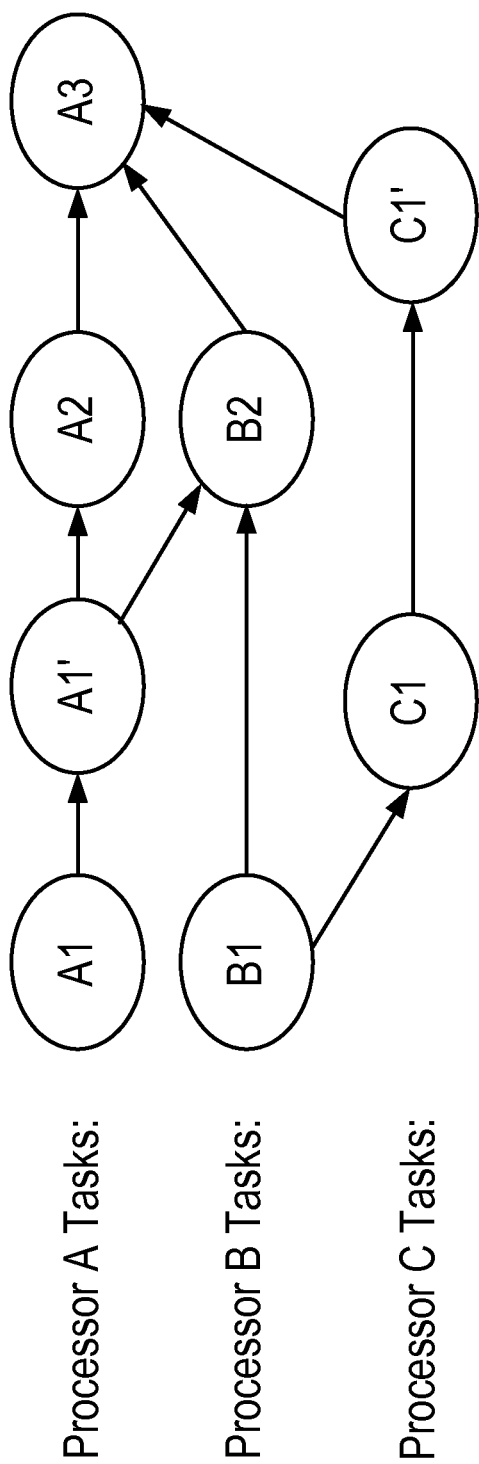
FIG. 1 is an exemplary task graph depicting a number of recurring tasks, with activation dependencies per iteration, that are to execute on a multiprocessor, in a self-timed manner.
Figure 2:
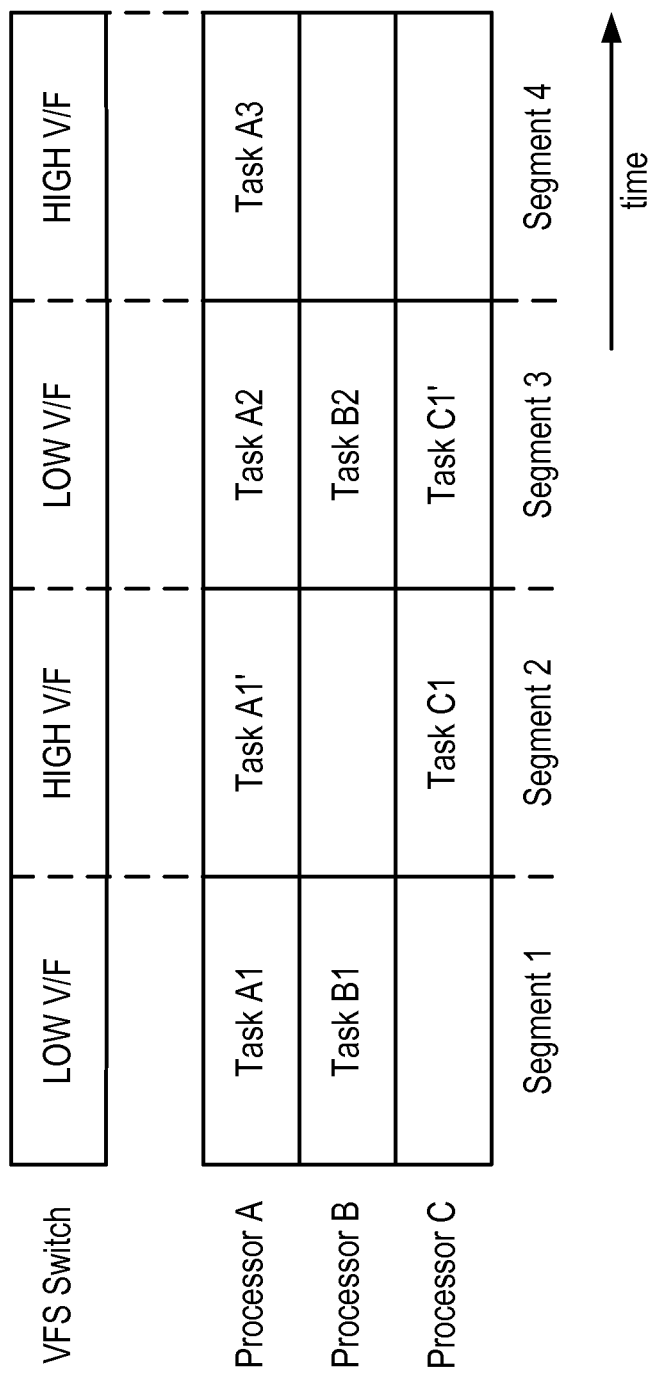
FIG. 2 depicts an ideal static schedule per processor for the exemplary graph of FIG. 1, assuming 2 Voltage-Frequency levels in the switch.
Figure 3:
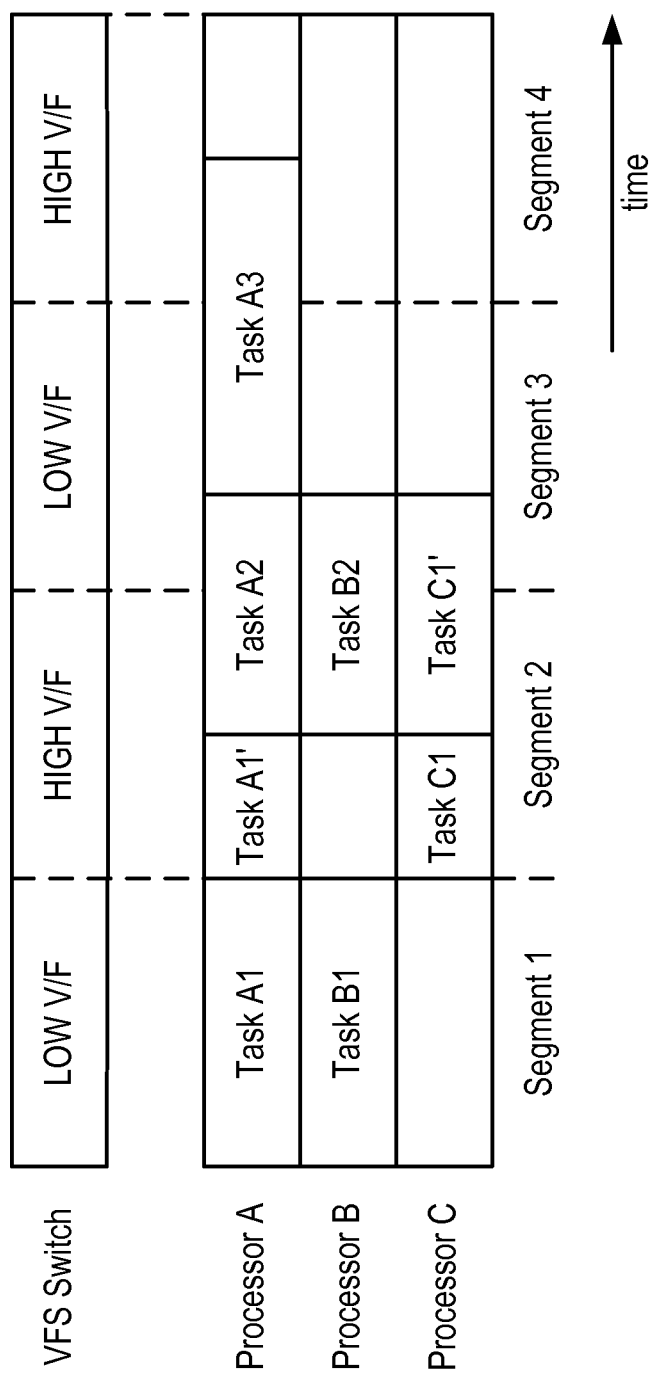
FIG. 3 is a scheduling graph depicting what happens when the execution of tasks of the program depicted in FIG. 1 is self-timed, and execution times of tasks can be shorter than worst-case, but with the switching of VFS levels being kept static periodic.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

A number of embodiments are described that address the problem of how to schedule a global V/F switch in a way that saves energy consumption on a multiprocessor chip, while also guaranteeing satisfaction of all real-time application timing requirements. As will be seen in greater detail, an aspect involves exploiting dynamic slack.

A first class of embodiments consistent with the invention is purely local in the sense that it does not require any synchronization amongst processing cores. It allows self-timing of tasks, but unlike conventional solutions guarantees energy savings that are at least as much as are attainable by means of static scheduling of V/F switches.

An aspect of this class of embodiments is that, if a task executing on a higher VF level than the next VF level in the VF schedule ends earlier than predicted, the processor is put on hold until the time of the next VF switch time, at which point it will wake up and start executing. Also, any triggers activated by the task that ended prematurely must also be suspended when the processor is put on hold, so that other tasks triggered by the prematurely ending task in other processors cannot start execution at a higher VF level than planned in the static schedule. What constitutes a "trigger" is implementation dependent. In implementations in which synchronization is event-driven, such triggers can be events. In implementations in which synchronization is data-driven, such triggers can be output data release.

One alternative to suspending synchronization triggers when a task ends prematurely during a Segment associated with a high V/F setting is to introduce a dependency in which all the tasks that start at the low V/F level require, in addition to all triggers defined by the task-graph, a trigger from the Dynamic Frequency and Voltage Scaling (DFVS) controller to start processing. This however, requires extra synchronization, more logic in the DFVS controller, and therefore has some drawbacks when compared with the solution of withholding triggers that was described above.

Another aspect of this class of embodiments is that if, at the time of the premature task completion, the V/F level is lower than the next level, the next task can start executing immediately because this will result in some work that had been planned to be performed at a higher VF level being performed at the lower VF level, thus increasing savings. The early start of any such task guarantees that the task cannot complete any later than was planned, and most likely it will complete earlier due to the time-monotonicity of the data flow model of computation.

Figure 4A:
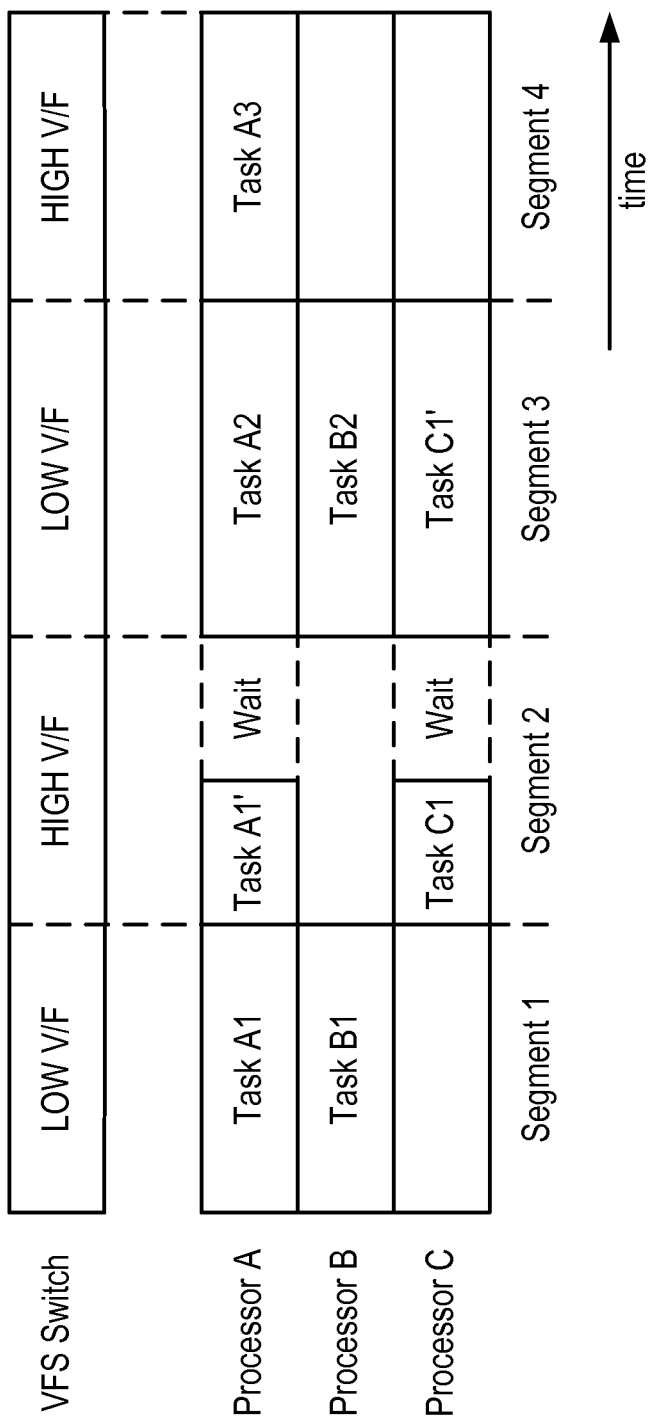
FIG. 4a is a scheduling graph showing the timing of task execution when the processes defined by the task graph of FIG. 1 are scheduled in accordance with a first class of embodiments consistent with the invention.

Setting aside the overhead associated with programming the timer, it can be seen that embodiments consistent with this class of embodiments guarantee that the self-timed system will save at least as much energy as the planned static periodic regime. However, it does not efficiently use the existing dynamic slack. FIG. 4a is a scheduling graph showing the timing of task execution when the processes defined by the task graph of FIG. 1 are scheduled in accordance with the first class of embodiments consistent with the invention. If a processor completes execution of a task before the end of its associated VF segment, the processor waits until the beginning of the next VF segment before starting its next scheduled task. In the example of FIG. 4a, all the processors are idle after completion of tasks A1' and C1, when ideally it would be possible to immediately start the execution of A2, B2, and C1' —this would be power efficient if it were possible to immediately switch to a lower frequency.

Figure 4B:
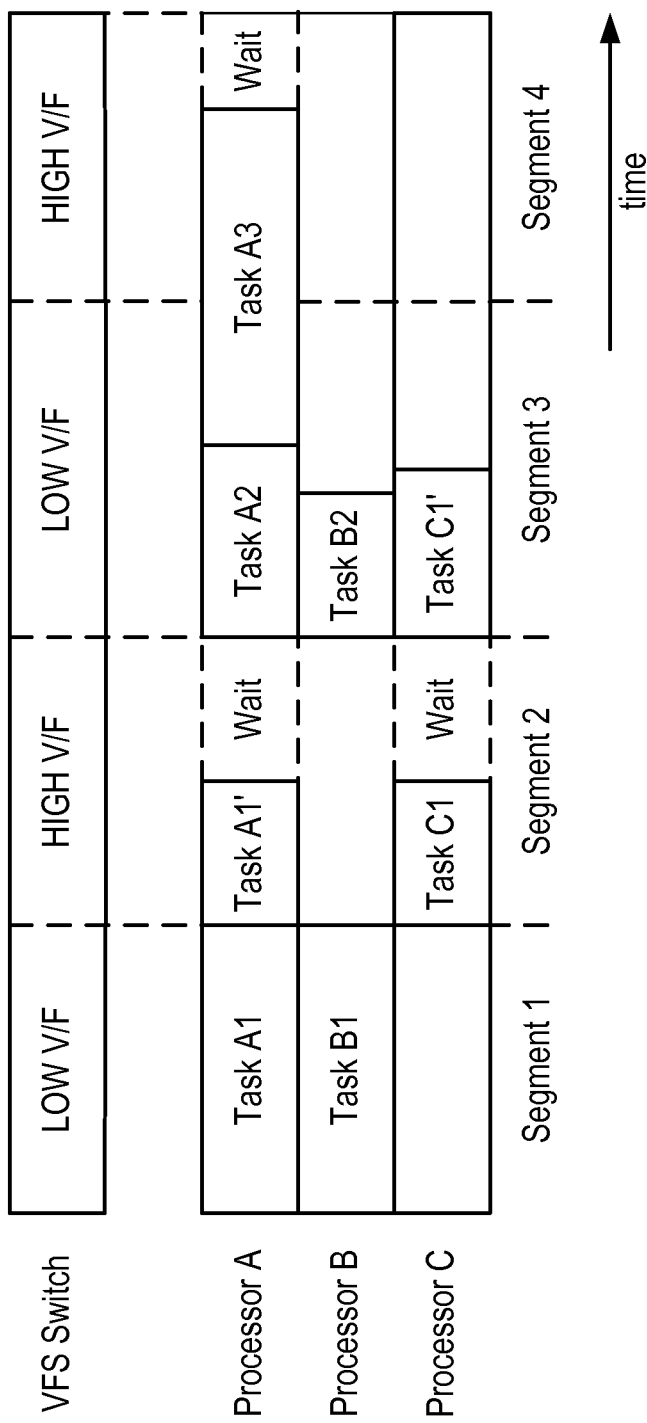
FIG. 4b is an alternative scheduling graph showing the timing of task execution when the processes defined by the task graph of FIG. 1 are scheduled in accordance with the first class of embodiments consistent with the invention.

FIG. 4b is an alternative scheduling graph showing the timing of task execution when the processes defined by the task graph of FIG. 1 are scheduled in accordance with the first class of embodiments consistent with the invention. If a processor completes execution of a task before the end of its associated VF segment, the processor waits until the beginning of the next VF segment before starting its next scheduled task, but this occurs only when the VF level is transitioning to a VF level that is lower than the VF level of the present segment. In all other cases, a next task is permitted to begin running early (i.e., at the VF level that is the same or lower than the next segment's VF level), assuming that all of its data and other dependencies have been satisfied.

In the example of FIG. 4b, all the processors are idle after completion of tasks A1' and C1, when ideally it would be possible to immediately start the execution of A2, B2, and C1' —this would be power efficient if it were possible to immediately switch to a lower frequency. But in this instance, the VF level for Segment 2 is higher than that of the next Segment (i.e., Segment 3). Accordingly, the start of the next tasks (A2, B2, and C1') are forced to wait until the scheduled start of Segment 3. In the meantime, the processors go into a low power state (essentially switched "off") to conserve energy. They will be powered up again at the start of Segment 3.

As further shown in this example, each one of the Tasks A2, B2, and C1' completes execution earlier than its anticipated worst case time. Because, in this instance, the VF level of the present segment (Segment 3) is not higher than that of the next scheduled segment (Segment 4), the next task scheduled for processor A (i.e., task A3) is permitted to begin early at a lower-than-planned VF level. An early start of A3 cannot occur unless all of its data and other dependencies have been satisfied, but in this example, each of the tasks A2, B2, and C1' completed early, so all of the preconditions for starting execution of A3 have been fulfilled. This early start of A3 improves performance because at least part of A3 is executed at a lower VF level (thereby saving energy), and although it takes longer than anticipated for A3 to run to completion (due to partial execution at a lower-than-planned VF level), it still finishes execution at or earlier than "on time", so there are no detrimental effects associated with this early start.

Further aspects of the first class of embodiments will become apparent from the following further description in the form of an exemplary embodiment.

Consider a system comprising two or more processors that may or may not be of the same architecture (i.e., the system can be either heterogeneous or homogeneous). In some embodiments, each processor has access to a programmable timer that is common among all of the processors. In alternative embodiments, each processor has access to its own timer, in which case each processor will have its own time reference and its own timer management process.

The timer(s) generates events at specified moments in time, these being initiated and defined by a call to set_timer (time). As an example, the timer event can be implemented as an interrupt that is seen by the processor(s).

It is also assumed that processors can inquire on the current absolute time of the timer by calling a procedure called current_time ( ). The value returned by current_time ( ) is the current absolute time.

The voltage-frequency switch (vf_switch) can be controlled by one or more processors, and in the pseudocode this is represented by a function switch_vf(vf_level) that instructs the vf_switch to switch from the current VF level to the level given by the function argument.

Furthermore, each processor has access to a function current_vf_level ( ) that that returns the current VF level of the switch. This function can be implemented for instance by querying the VF switch, if this is supported by the hardware. Alternatively, as in the case of the first class of embodiments, the value of the current VF level can be locally inferred by checking the current time and matching it against the static schedule, since in the first solution the VF-switch is strictly implementing the static periodic schedule as given.

Other interfaces for programming the timer are possible. For example, it can be that the timer is only programmed in terms of elapsed time instead of absolute time, and that absolute time is accounted for locally by processing the timer events.

It is not essential that the timer generate interrupts. What is needed is a mechanism for processes on processors to switch off and wake up in response to an event: For example, when using a processor that provides flags or semaphores and the ability to wait for those flags/semaphores to change state, the timer event can be connected to an event flag/semaphore instead of an interrupt line.

In the general case, the processors are configured with an ability to invoke a wait (event) function that switches off the processor and turns it back on when a specific event (or a combination of events) occurs. It is observed, however, that this first class of exemplary embodiments, there is a need only for waiting on timer events.

Tasks are set to execute by calling an execute (task) function, which means that the task is enabled to run as soon as all of its activation requirements have been satisfied. Due to self-timed behaviour, the set (enabled) task still needs to fulfil its activation requirements in terms of data availability; as a result, the task will still block and wait for data availability if this has not already been satisfied at the time the call to execute (task) has been made.

The exemplary embodiment utilizes a representation of the static periodic schedule that can be obtained by, for example, applying the algorithm described in Moreira et al. More particularly, each processor has a schedule variable that comprises a list of segment records. In the following pseudocode, the schedule variable is referred to as static_periodic_schedule. Each segment item in the schedule contains a pointer to the task that must execute on that segment, the duration of the segment in time units, and the VF level that should be applied during that segment. In the following pseudocode, segments have the following structure

```
struct Segment {
    unsigned int duration;
    Vf_level vf_level;
    List of Procs descendants;
    Task task}
``` where:
Vf_level can be, for example, an enum type;
Task can be, for example, a function pointer type (or void * in the C programming language)
descendants is a list of processors (not tasks) whose execution for the next segment is dependent on the end of the execution of the task being executed in this Segment on this processor, and which need to be triggered at the end of executing the task. To give an example, with reference to the processes defined by the task graph of FIG. 1, the segment corresponding to task A1' has to include processor B in the list of descendants, since task B2 is dependent on task A1'. As for local triggers, such as A1' to A2, they are in principle unnecessary as it is assumed that there is a guaranteed static order of execution per processor).

The list of segments for each processor is identical for all processors, except Task, which is processor-specific and corresponds to the task that should be executed on that processor, on that segment, according to the pre-computed static periodic schedule.

Each segment corresponds to a VF level.

If the schedule implies that an original task needs to execute partially in one level, and partially in another level, then the same approach as was described with respect to the task graph of FIG. 1: the task is split into two subtasks, one to be executed in each respective VF level. This is illustrated in FIG. 1 by the tasks A1 and A1', which are the result of splitting an original task into two segments, one to be executed at high VF and another at low VF.

A function next_segment (schedule) is provided that returns the next segment in the schedule schedule. In this exemplary embodiment, once the last segment in the list is returned by a call to next_segment, the next call will again return the first segment, and so on. This is not a requirement on all implementations, however.

In these exemplary embodiments, execution of a task does not include the synchronization triggers to the next task; these have to be explicitly generated by invoking the procedure emit_triggers_to_descendants (Segment List).

Each processor has an application task process that executes a sequence represented in the exemplary pseudocode below:

```
new_segment <- next_segment (static_periodic_schedule)
repeat
    execute (new_segment.task);
    old_segment= new_segment;
    new_segment <- next_segment(static_periodic_schedule)
    if (current_vf_level( ) >= new_segment.vf_level)
        wait (timer_event);
    emit_triggers_to_descendants(old_segment.descendants);
```

Expressed in a narrative form, the process executes the tasks, enforcing execution order according to the static periodic schedule. It allows tasks to start executing before the time stipulated in the static periodic schedule, but only if the current VF level is lower or equal to the level required by the task, as stipulated in the static periodic schedule. The "if" statement tests for a transition to a lower VF level compared to the current VF level, and if this condition is satisfied then, instead of immediately enabling the next scheduled task for execution, the "wait(timer_event)" function is called, which forces the processor to wait for the occurrence of a timer event (marking the beginning of the lower VF level) before starting to execute the next task. Since, in this class of embodiments, the timer event signifies the occurrence of a VF switch (VF switches adhere to the static schedule), this is the equivalent of waiting for a VF switch to occur.

In addition to the above-described process that is run on each processor (i.e., each core), there is a process that controls the timer and the vf_switch. This process can run on any of the application processors, or it can run on a dedicated processor or accelerator, in either software or hardware. This process is herein referred to as the Power Manager, and an exemplary embodiment has the following functionality, exemplified in the form of pseudocode:

```
repeat
    current_segment <- next_segment (static_periodic_schedule)
    end_of_segment <- current_time( )+ current_segment.wc_time;
    switch_vf (current_segment.vf_level)
    set_timer (end_of_segment);
    wait(timer_event);
```

In the above code, the first line obtains the next segment and assigns it as the "current segment". In the second line, the time at which that segment should end is determined as the current time plus the worst case ("wc") time required for execution of the segment. Then, the VF switch is made to the new level and a timer is set so that it will cause a timer event at the computed "end of segment" time. The Power Manager then waits for the timer event to occur.

As an alternative to the explicit representation of the schedule, the code of the application is unrolled, each task is called, and the code for handling segments and timer events is just interleaved with task execution.

As mentioned earlier, in the above-described class of embodiments it is possible to experience intervals in which all processors are idle. For example, FIGS. 4a and 4b show instances in which all of the processors are idle after completion of tasks A1' and C1. This is wasteful of time, since there is no functional reason why tasks A2, B2, and C1' cannot be started immediately instead of having to wait for the beginning of the next VF segment. However, in order to avoid unnecessarily expending power by starting these tasks early at the higher VF level, it is desirable to also immediately switch to a lower VF level.

Figure 5:
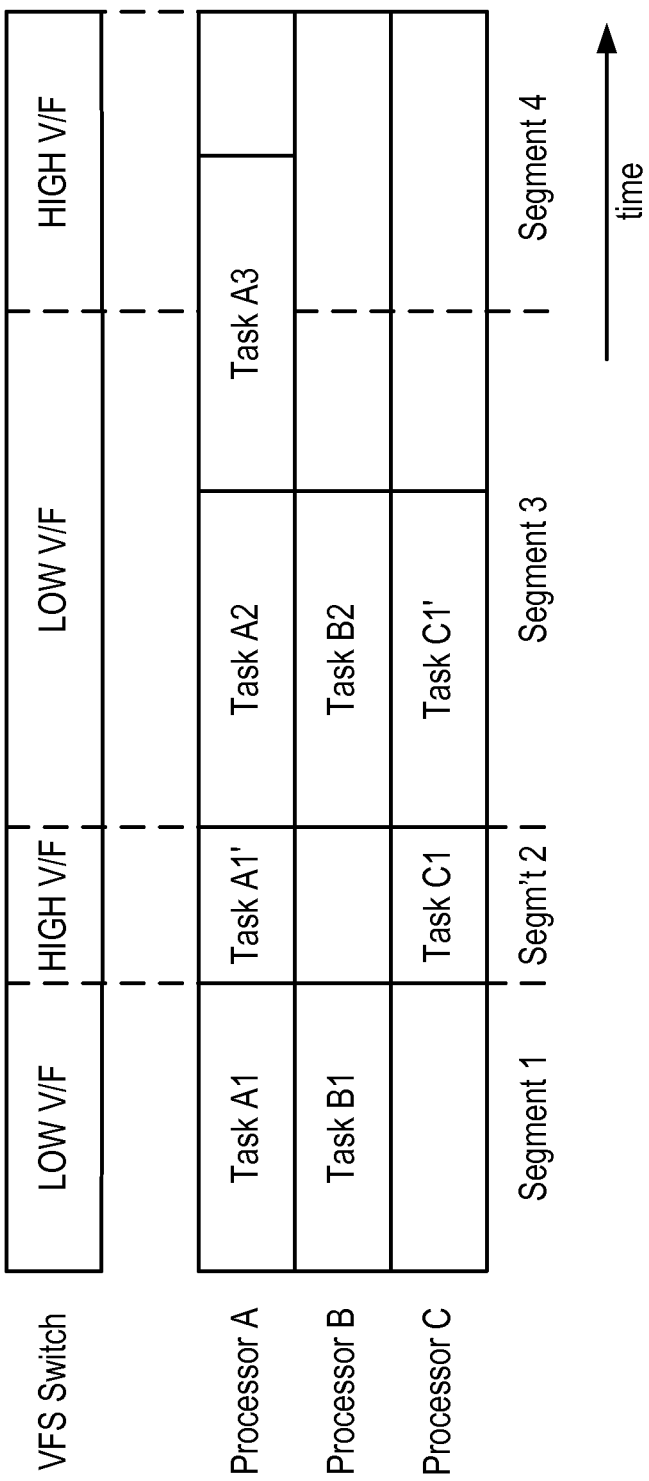
FIG. 5 is a scheduling graph showing the timing of task execution when the processes defined by the task graph of FIG. 1 are scheduled in accordance with the second class of embodiments consistent with the invention.

The inventors' insight in this respect leads to a second class of embodiments. To illustrate various aspects, FIG. 5 is a scheduling graph showing the timing of task execution when the processes defined by the task graph of FIG. 1 are scheduled in accordance with the second class of embodiments consistent with the invention. In one aspect, the scheduling of the VFS switch is allowed to be self-timed rather than static. If all tasks that need to be executed at high frequency have run to completion before the planned worst-case time, then the switch is programmed to switch to the low frequency in advance of the prescheduled time, and the execution at all processors is allowed to progress to the next task. However, when the switch is being made from a low VF setting, it stays at the low VF setting until the original expected worst-case switching time. Tasks are allowed to start executing in advance of the expected worst-case switching time, which has the beneficial effect of increasing power savings. This is because tasks that were planned to execute entirely at the high VF setting will start execution earlier, at a lower energy consumption level, and thus profit from dynamic slack. This procedure essentially lengthens the intervals of time in which the processor executes at the low VF level, and shortens the intervals of time in which the processor executes at the high VF level, compared to the planned static periodic scheduler.

Figure 6:
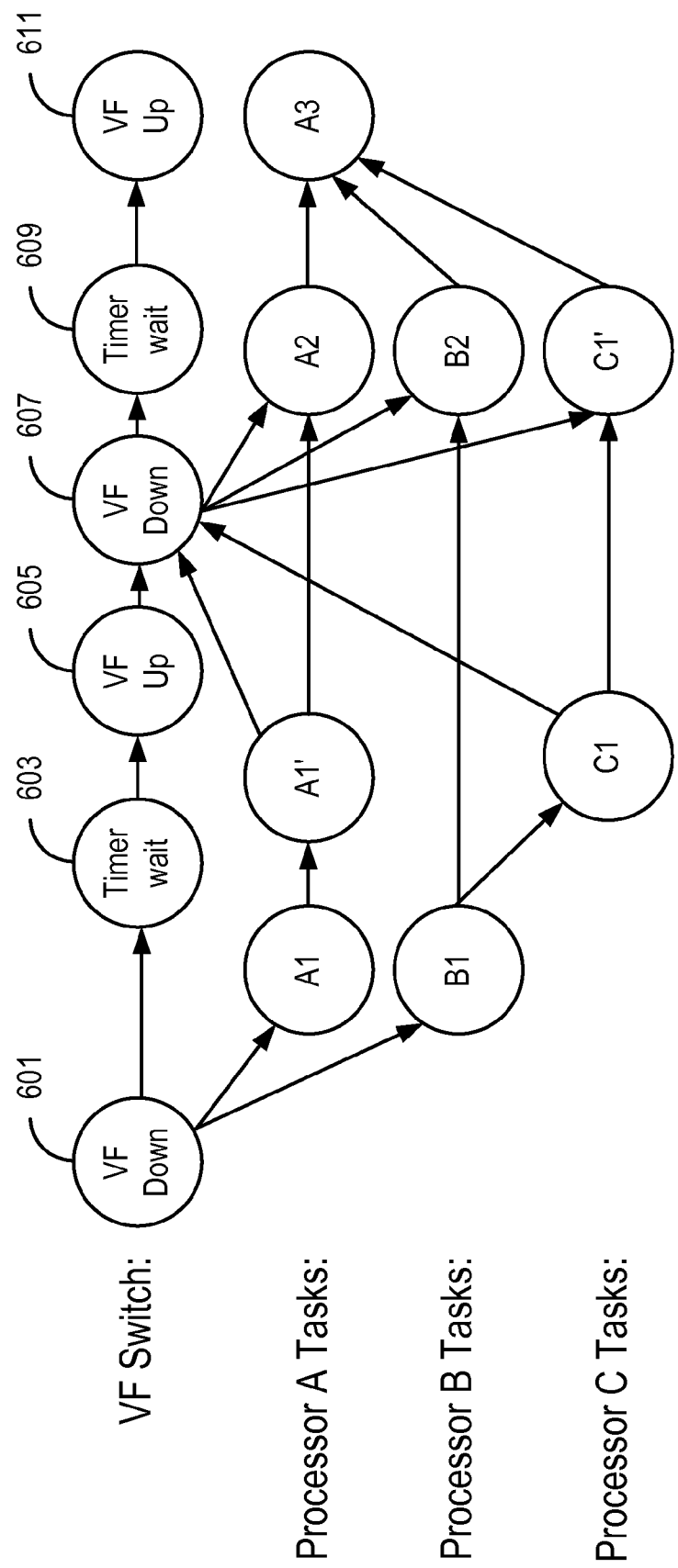
FIG. 6 depicts the activation dependencies between the original tasks of the task graph of FIG. 1 and the VF switch transitions and timer events in accordance with the second class of embodiments.

FIG. 6 depicts the activation dependencies between the original tasks of the task graph of FIG. 1 and the VF switch transitions and timer events in accordance with the second class of embodiments. In this kind of data flow graphs there can be no activation based on a logical OR'ing of the dependencies: each task activates only if all of its inputs are available. For this reason, only the dependencies that are relevant to each VF switch transition are depicted: The design assumes that each task completes at or before the predicted worst-case times, so that the VF Down task never needs to be activated by a Timer Wait event. The VF Up task does not depend on task completion in any instance because, in this second class of embodiments, task completion is not allowed to prematurely force a low to high VF transition; instead, the VF Up task depends on a timer event.

Walking through FIG. 6, it can be seen that when a VF Down switch 601 is made, tasks A1 and B1 are activated. At the same time, a timer wait period 603 is started, the expiration of which causes a VF Up switch 605 to occur. The length of the wait is based on worst-case expected execution times for the concurrent running of tasks A1 and B1. Completion of task A1 is sufficient to cause task A1' to be activated regardless of whether the Timer Wait period 603 has expired, so that task A1' could begin execution at a VF low setting, or at a VF high setting. Similarly, completion of task B1 is sufficient to cause task C1 to be activated regardless of whether the Timer Wait period 603 has expired, so that task C1 could begin execution at a VF low setting or at a VF high setting.

Occurrence of the VF Up switch 605 sets up the VF Down switch 607 to be the next VF switch to be made, but this does not occur until both of the tasks A1' and C1 have run to completion. (The VF Down switch 607 is dependent on completion of both tasks A1' and C1.) Occurrence of the VF Down switch 607 enables activation of tasks A2, B2, and C1'. Notice that tasks A2 and C1' will occur when the VF Down switch 607 occurs because they, like VF Down 607, are dependent on completion of tasks A1' and C1. However, occurrence of the VF Down switch 607 is not a sufficient condition to activate task B2 because of that task's dependence also on completion of task B1. (The VF Down switch 607 is not dependent on completion of task B1 and could therefore occur ahead of task B1 completion.)

Activation of the VF Down 607 switch 607 activates the start of a timer wait period 609, the expiration of which causes a VF Up switch 611 to occur. The length of the wait is based on worst-case expected execution times for the concurrent running of tasks A2, B2, and C1'. Task A3, although scheduled to run at a high VF setting, is dependent only upon completion of the three tasks A2, B2, and C1'. Consequently, if all three of these tasks finish execution in advance of their worst-case execution times, the task A3 could be activated early, while the processors are still operating at the low VF setting. If task A3 is still running when the Timer wait period 609 expires, task A3 will finish execution at a high VF setting.

Further aspects of the second class of embodiments will become apparent from the following further description in the form of an exemplary embodiment. This embodiment relies on the same environment as was described above with respect to the first class of embodiments except that now calls to the wait function can be dependent on events generated by all processors (although not every processor needs to receive events from every other processor). Also, another function, emit (event)), is added that allows the generation of an event by a processor.

Since in this solution there is no need to withhold synchronization triggers after execution of a task, a simplification is made by removing the need for explicit synchronization calls. This is now part of task execution.

In brief, the Power Manager process needs to receive events from all other processors, and all other processors need to receive events from the Power Manager. Any of a number of relay mechanisms can be employed to accomplish this, but the increased delay must be taken into account in the timing of events.

The task execution process running on each processor is in accordance with the following exemplary pseudocode:

```
wait(switch_event);
repeat
    old_segment <- new_segment;
    new_segment <- next_segment(static_periodic_schedule);
    if new_segment.vf_level < old_segment.vf_level
    then {emit(wait_event_processor_n); wait(switch_event);}
    execute(current_segment.task);
```

The above pseudocode describes the following processing: Processing begins when a switch event occurs, at which point the following is repeated:

Processing is oriented in accordance with the next segment in the schedule, so that old_segment is given the present value of new_segment, and new_segment is assigned the value of the next segment in the static periodic schedule.

The "if" statement tests to ascertain whether a switch is being made to a lower VF level than the one from which the switch is being made. If this is the case, then it may be possible to begin execution of the next scheduled task early, but in order to avoid running that next task at a higher-than-necessary VF level, it is desired to actually make an early switch to the lower VF level. But this switch cannot be made until all of the tasks associated with this present, "higher", VF level have finished execution; otherwise one or more of those other tasks would be forced to finish their execution at an unplanned-for lower VF level.

Ensuring compliance with these requirements involves this task emitting its "completed" status to the Power Manager, and then waiting for the Power Manager to actually make the VF switch. (The function call emit (wait_event_processor_n) notifies the Power Manager that processor "n" (where the value of "n" is an identifier of the processor making the function call) has completed its task and is going into a wait state (during which the processor goes into a reduced power state, essentially "off"). Following occurrence of the VF switch, which the processor becomes aware of when it returns from the "wait", the processor switches back on and begins executing the next scheduled task (denoted by "current_segment.task"). As will be seen below with respect to the Power Manager, the switch event will occur upon the earlier of a segment timer event and detection that all running tasks associated with the current segment have completed and are waiting for a switch event.

It will be observed that if the segment is not switching to a lower VF level (i.e., it is switching to a same or higher VF level), then the "if" statement's predicate is not satisfied, and execution of the next scheduled task will begin immediately. This is acceptable because the task is beginning early and its initial VF level is at or lower than the pre-scheduled level for that task, so that there will not be any unnecessary expenditure of power or delay in its completion. Thereby, performance is improved without any associated negative effects.

As with the first class of embodiments, the second class of embodiments also includes a power manager process that controls the timer and the of switch. This process can run on any of the application processors, or it can run on a dedicated processor or accelerator, in either software or hardware. An exemplary embodiment of the Power Manager for the second class of embodiments has the following functionality, expressed here in pseudocode:

```
wc_time_for_next_switch <- 0
repeat
    if (all execution processes are waiting) or (timer_event)
    then
        current_segment <- next_segment (static_periodic_schedule);
        switch_vf(current_segment.vf_level);
        wc_time_for_next_switch<- wc_time_for_next_switch
                                        + current_segment.wc_time;
        set_timer (wc_time_for_next_switch);
        emit(switch_event);\*awakens all processing processes*\
    wait(timer_event | any wait event by any of the processors)
```

Expressing this in a narrative form, the worst case time for the next switch is initialized to a predetermined value, such as zero. Then, the following functionality is carried out repeatedly: For each segment, a VF switch will occur whenever it is detected that the duration of the segment has reached its maximum predefined value or that all processes scheduled to run during this segment have run to completion and are waiting for notification of a switch event.

In the pseudocode, this functionality is expressed first by the "if" statement, which tests for the occurrence of "all execution processes are waiting" or the occurrence of a timer event. Power Manager processing remains here until one of these conditions is satisfied.

When either condition is satisfied, the next segment is selected from the static periodic schedule, and this "next" segment is made the "current" segment. then a VF switch is made to the VF level associated with the new current segment.

A future moment in time that will mark the end of the segment is calculated as the present time (taken as the present value of wc_time_for_next_switch) plus the "worst case" time associated with the new current segment (i.e., the worst of the worst case execution times of the tasks that are associated with the new current segment). This calculated future moment in time is then used as the basis for setting when the next timer event will occur.

Then, having made the VF switch and having set the timer that will cause a timer event upon expiration of the new current segment, all waiting processors are notified (via the "emit" function) that the VF switch has occurred. The Power Manager then puts itself into a wait state, which will end upon the occurrence of either the next timer event or notification of a wait event from any one of the processors.

It will be appreciated that if the Power Manager wakes up due to notification from one of the processors that that it (i.e., the processor) has entered a wait state, this does not necessarily cause the next VF switch to occur. This is because there may yet be other processors that have not run their tasks to completion. When this is the case, the predicate tested by the "if" statement will result in "false", and all of the processing associated with the "then" statement will be skipped; instead, the Power Manager will merely again go into the "wait state", again waiting for the occurrence of either the next timer event (the timer will still be running from the last time it was set) or notification of a wait event from any one of the processors.

Figure 7A:
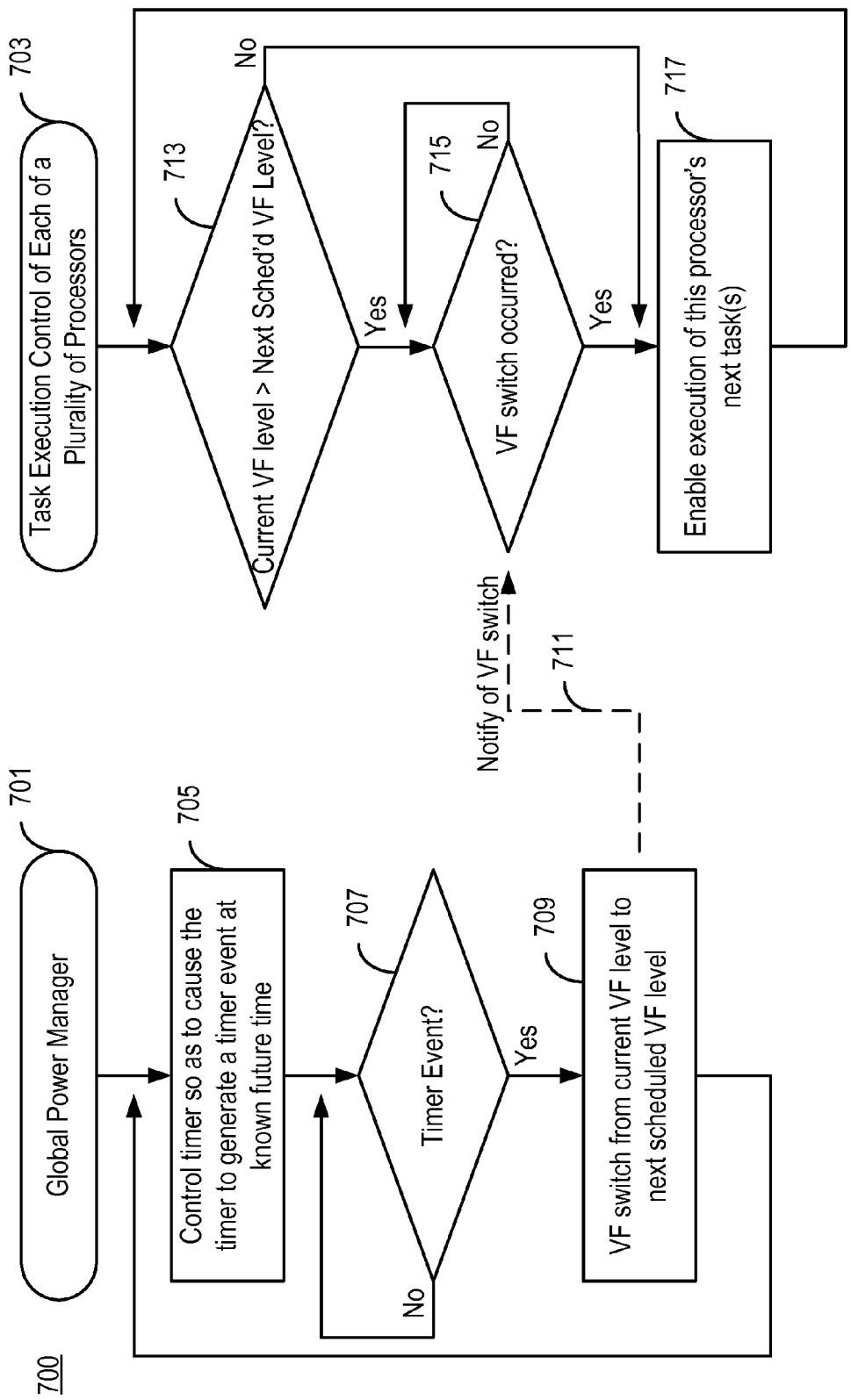
FIG. 7a is, in one respect, a flow chart of steps/processes performed by circuitry in accordance with some but not necessarily all exemplary embodiments of the invention consistent with the first class of embodiments.

To further illustrate aspects of embodiments consistent with the invention, FIG. 7a is, in one respect, a flow chart of steps/processes performed by circuitry in accordance with some but not necessarily all exemplary embodiments of the invention consistent with the first class of embodiments for the purpose of coordinating the scheduling of VF settings with the scheduling of tasks in each of a number of concurrently running processors. In another respect, FIG. 7a can be considered to depict exemplary means 700 comprising the various illustrated circuitry (e.g., hard-wired and/or suitably programmed processor) configured to perform the described functions.

FIG. 7a depicts two processes, which run concurrently: a Global Power Manager 701 and a Task Execution Control of a Processor 703. In practice, there will be more than one processor, and each of the processors will itself run the Task Execution control of a Processor 703; only one of them is depicted merely for the sake of simplifying the figure.

The exemplary method of controlling task execution among the plurality of processors that are configured to operate concurrently at a global Voltage/Frequency (VF) level includes using a global power manager to control Voltage/Frequency (VF) switching from one VF level to another VF level, wherein a same current VF level governs VF settings of each of the processors; and each one of the processors controlling whether the one of the processors will wait for a VF switch from a current VF level to a next VF level prior to enabling execution of a next scheduled task for the one of the processors.

In this class of embodiments, the global power manager performs a VF level switching process that comprises controlling a timer so as to cause the timer to generate a timer event at a known future time (step 705). A test is performed to ascertain whether a timer event has occurred (decision block 707). So long as the timer event has not yet occurred ("No" path out of decision block 707), processing continues to test for this condition.

Whenever the timer event occurs, it is detected ("Yes" path out of decision block 707) and in response to the detection, a VF switch is caused to happen from a current VF level to a next scheduled VF level (step 709). The Global Power Manager 701 then sends notifications to all affected processors, informing them that the VF switch has occurred (step 711).

Concurrently with the actions of the Global Power Manager 701, the Task Execution Control of each processor 703, at a time that is, for example, when a presently running task has completed (other times are possible in alternative embodiments), compares the current VF level with a next scheduled VF level (decision block 713).

Responsive to detecting that the current VF level is higher than the next scheduled VF level ("Yes" path out of decision block 713), the processor waits for the VF switch from the current VF level to the next VF level. This can be accomplished by, for example, waiting to receive notification that the VF switch has occurred (step 715). In some, but not necessarily all embodiments, the "notification" can be in the form of waiting for occurrence of the same timer event that the Global Power Manager 701 is waiting for. It will be recognized that this "waiting" occurs prior to enabling execution of the next scheduled tasks of the one of the processors to begin. In response to detecting that the VF switch has occurred ("Yes" path out of decision block 715), the processor enables execution of this processor's next task(s) (step 717).

Referring back to decision block 713, if it is detected that the current VF level is not higher than the next scheduled VF level ("No" path out of decision block 713), the processor enables execution of the next scheduled tasks of the one of the processors to begin (step 717) without waiting for the VF switch from the current VF level to the next VF level.

Figure 7B:
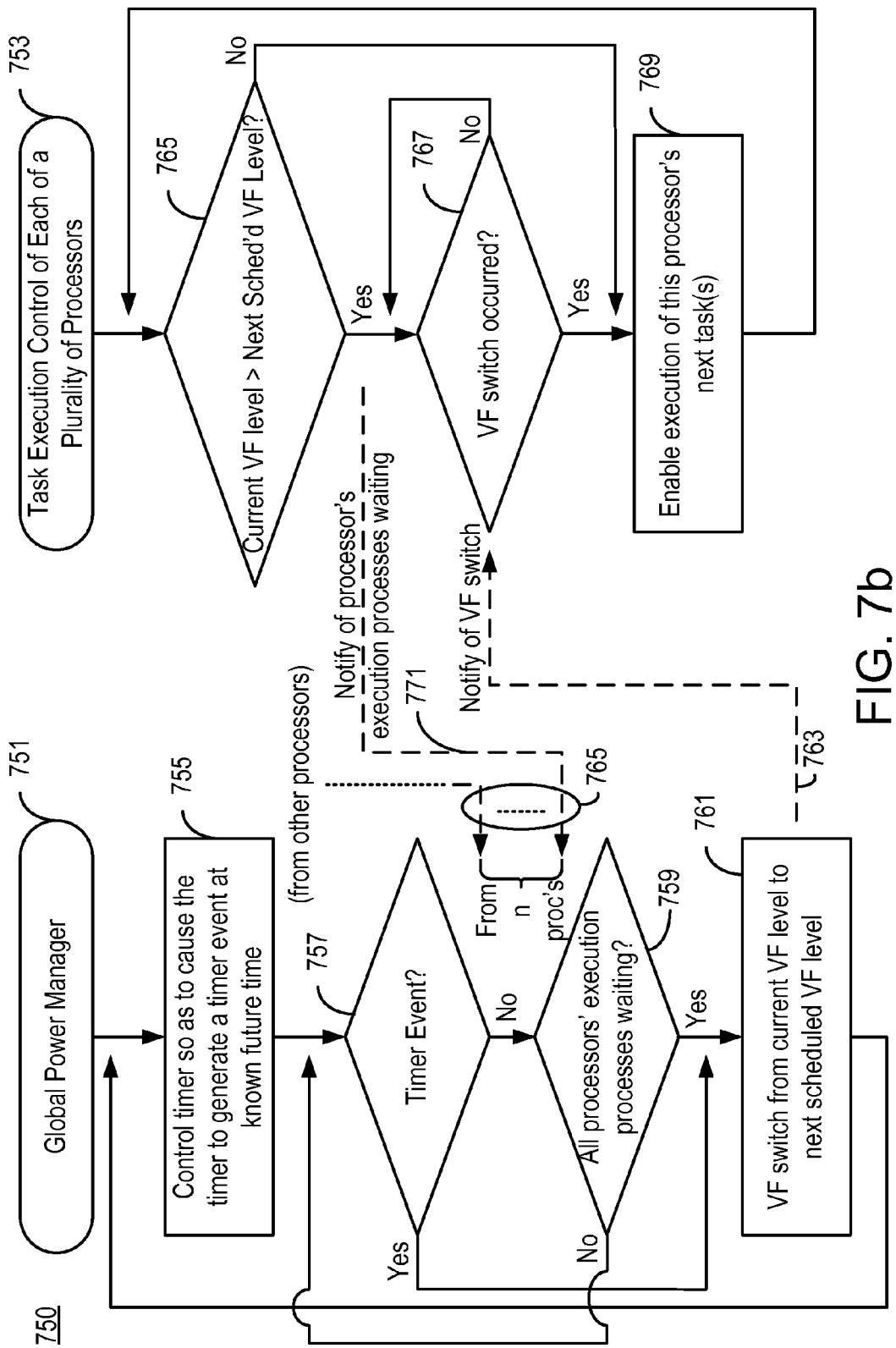
FIG. 7b is, in one respect, a flow chart of steps/processes performed by circuitry in accordance with some but not necessarily all exemplary embodiments of the invention consistent with the second class of embodiments.

To further illustrate aspects of embodiments consistent with the invention, FIG. 7b is, in one respect, a flow chart of steps/processes performed by circuitry in accordance with some but not necessarily all exemplary embodiments of the invention consistent with the second class of embodiments for the purpose of coordinating the scheduling of VF settings with the scheduling of tasks in each of a number of concurrently running processors. In another respect, FIG. 7b can be considered to depict exemplary means 750 comprising the various illustrated circuitry (e.g., hard-wired and/or suitably programmed processor) configured to perform the described functions.

FIG. 7b depicts two processes, which run concurrently: a Global Power Manager 751 and a Task Execution Control of a Processor 753. In practice, there will be more than one processor, and each of the processors will itself run the Task Execution control of a Processor 753; only one of them is depicted merely for the sake of simplifying the figure.

The exemplary method of controlling task execution among the plurality of processors that are configured to operate concurrently at a global Voltage/Frequency (VF) level includes using a global power manager to control Voltage/Frequency (VF) switching from one VF level to another VF level, wherein a same current VF level governs VF settings of each of the processors; and each one of the processors controlling whether the one of the processors will wait for a VF switch from a current VF level to a next VF level prior to enabling execution of a next scheduled task for the one of the processors.

In this class of embodiments, the global power manager performs a VF level switching process that comprises controlling a timer so as to cause the timer to generate a timer event at a known future time (step 755). A test is performed to ascertain whether a timer event has occurred (decision block 757). If the timer event has not yet occurred ("No" path out of decision block 757), processing continues to test whether all processors' execution processes are waiting for an occurrence of a VF switch (step 759).

The Global Power Manager 751 can test for this by, for example, testing to see whether it has received a notification 765 from each of the processors, indicating that it is waiting for a VF switch. If fewer than all of the processors are waiting for a VF switch event, the condition is not satisfied ("No" path out of decision block 759) and processing reverts back to decision block 757.

Whenever the timer event occurs, it is detected ("Yes" path out of decision block 757) and in response to the detection, a VF switch is caused to happen from a current VF level to a next scheduled VF level (step 761). Similarly, whenever all processors' execution processes are waiting for a VF switch, this condition is detected ("Yes" path out of decision block 759) and in response to the detection, a VF switch is caused to happen from a current VF level to a next scheduled VF level (step 761). The Global Power Manager 751 then sends notifications to all affected processors, informing them that the VF switch has occurred (step 763).

Concurrently with the actions of the Global Power Manager 751, the Task Execution Control of each processor 753, at a time that is, for example, when a presently running task has completed (other times are possible in alternative embodiments), compares the current VF level with a next scheduled VF level (decision block 765).

Responsive to detecting that the current VF level is higher than the next scheduled VF level ("Yes" path out of decision block 765), the processor waits for the VF switch from the current VF level to the next VF level. This can be accomplished by, for example, waiting (step 767) to receive the notification 763 that the VF switch has occurred. It will be recognized that this "waiting" occurs prior to enabling execution of the next scheduled tasks of the one of the processors to begin.

In this second class of embodiments, it is important for each processor to notify the Global Power Manager 751 that it is waiting for a VF switch to occur. Therefore, also associated with detecting that the current VF level is higher than the next scheduled VF level ("Yes" path out of decision block 765) is the processor sending out its individual notification that it is waiting for a VF switch to occur (step 771).

In response to detecting that the VF switch has occurred ("Yes" path out of decision block 767), the processor enables execution of this processor's next task(s) (step 769).

Referring back to decision block 765, if it is detected that the current VF level is not higher than the next scheduled VF level ("No" path out of decision block 765), the processor enables execution of the next scheduled tasks of the one of the processors to begin (step 769) without waiting for the VF switch from the current VF level to the next VF level.

As explained earlier, the fact that a task has been "enabled" to begin does not mean that it will actually begin immediately. In accordance with dataflow programming techniques, each task still cannot begin its execution until all task specific dependencies of the task have been satisfied. Task specific dependencies can include, for example and without limitation, task specific data dependencies.

Figure 8:
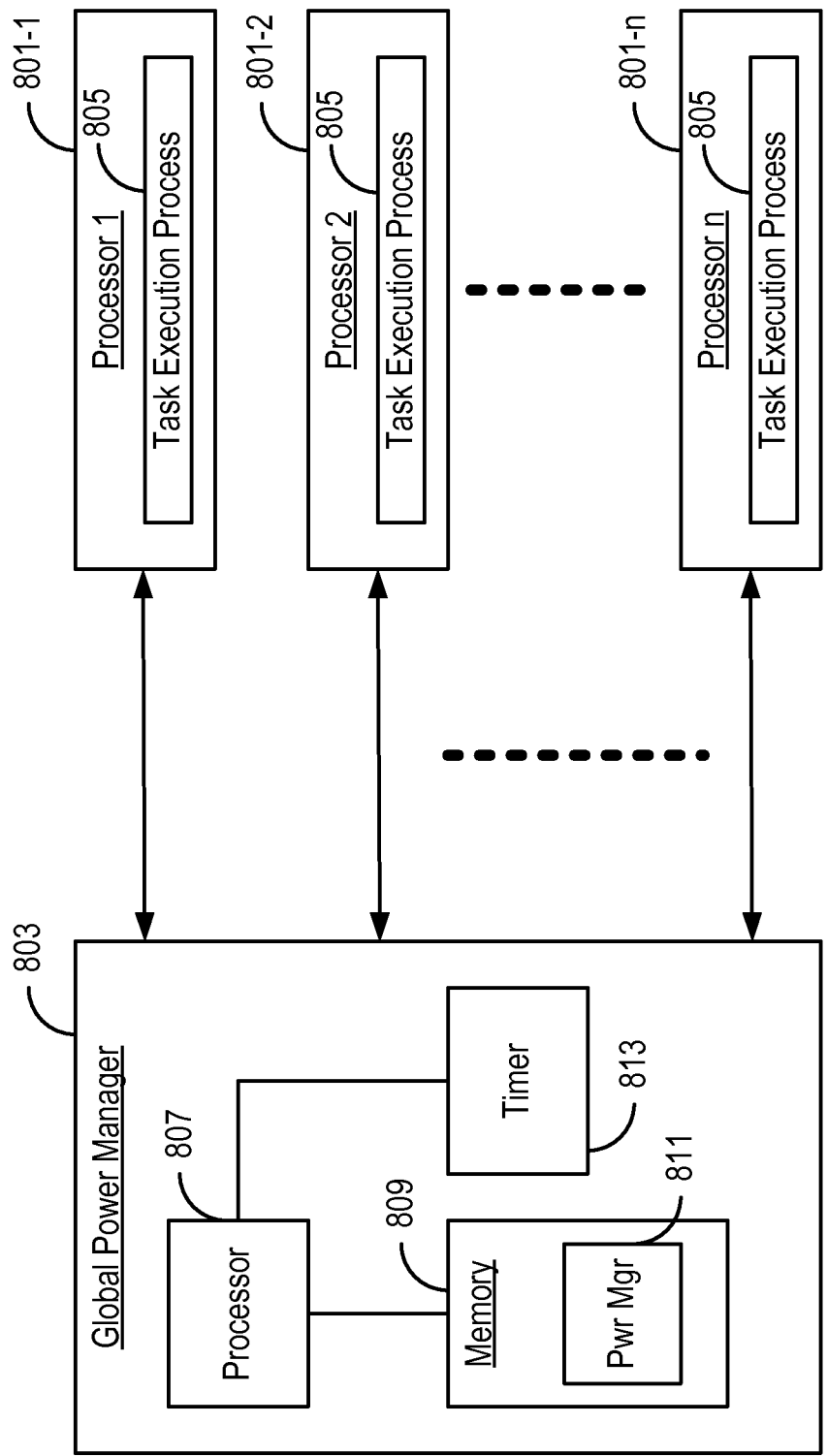
FIG. 8 is a block diagram of an exemplary arrangement of asynchronous dataflow dependent processors, each connected to the same Global Power Manager.

FIG. 8 is a block diagram of an exemplary arrangement of asynchronous dataflow dependent processors 801-1, 801-2, . . . , 801-n, each connected to the same Global Power Manager 803. The processors 801-1, 801-2, . . . , 801-n need not be identical to one another, but a common factor is that each has task execution process circuitry 805 (e.g., hardwired and/or a software-directed processor) configured to carry out task scheduling in accordance with any of the embodiments described herein, such as but not limited to the Task Execution Control 703, 753 of either of FIGS. 7a and 7b. Similarly, the Global Power Manager 803 comprises circuitry configured to carry out VF switching control in accordance with any of the embodiments described herein, such as but not limited to respective ones of the Global Power Managers 701 and 751 depicted in FIGS. 7a and 7b. The exemplary Global Power manager 803 of this example comprises a programmable processor 807 coupled to a processor readable storage medium, exemplified by the memory 809. The memory 809 has stored therein power manager software 811 that includes program instructions for controlling the processor 807 as well as scheduling information about VF levels to be used for each of a series of segments.

The processor 807 is also coupled to control and receive signals/data from a programmable timer 813 that is capable of generating a timer event when the pre-programmed timer value has been reached.

A number of exemplary embodiments have been described. However, the various aspects of embodiments consistent with the invention are not limited in application only to platforms with a single global switch; they can equally be used in any instances where two or more cores share one VFS switch.

The various embodiments have advantages over conventional technology. For example, with respect to a fully static schedule:

they do not require all tasks to execute according to their worst-case execution times;

they can profit from extra savings of power due to dynamic behavior barring high overhead in inter-task communications or with respect to programming the timer, they will always provide lower energy consumption than a static solution In addition:

Correct functional operation is robust versus negative margins in the timer embodiments per core are very simple, and can be realized in software or in hardware Comparing the two classes of embodiments described above, the second always provides better energy consumption, if one ignores the overhead that the communication between the VF switch scheduler and the processors introduces. But, the first class of embodiments also introduces the overhead of programming the timer.

The assessment of the technology set forth above makes mention of energy consumption with respect to the overhead involved in programming timers and inter-task synchronization. How high this overhead turns out to be depends on the hardware support for timers and inter-task communication. It is anticipated that the embodiments are more complex than a simple static VFS technology, and each processor needs to maintain knowledge of the VFS schedule switch points, and of the worst-case execution times of its task.

The invention has been described with reference to particular embodiments. However, it will be readily apparent to those skilled in the art that it is possible to embody the invention in specific forms other than those of the embodiment described above.

For example, the focus in the exemplary embodiments has been on VFS static periodic schedules for all tasks, along with static periodic schedules for the switching between different frequency levels for the global VFS switch. However, this is not an essential characteristic of the application. To the contrary, the various aspects of above-described embodiments are equally applicable even if the original schedule is not periodic.

Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of controlling task execution among a plurality of processors that are configured to operate concurrently at a same global Voltage/Frequency (VF) level, the method comprising:

using a global power manager to control VF switching from one VF level to another VF level, wherein a same current VF level governs VF settings of each of the processors; and each one of the processors controlling whether the one of the processors will wait for a VF switch from a current VF level to a next VF level prior to enabling execution of a next scheduled task for the one of the processors, wherein:

the global power manager performs a VF level switching process that comprises:

controlling a timer so as to cause the timer to generate a timer event at a known future time; and whenever the timer event occurs, detecting the timer event and in response to said detection, causing a VF switch from a current VF level to a next scheduled VF level; and controlling whether said one of the processors will wait for a VF switch from the current VF level to the next VF level prior to enabling execution of the next scheduled task for the one of the processors comprises:

detecting that the current VF level is higher than the next scheduled VF level; and responsive to said detecting that the current VF level is higher than the next scheduled VF level, causing the one of the processors to wait for the VF switch from the current VF level to the next VF level prior to enabling execution of the next scheduled tasks of the one of the processors to begin, otherwise enabling execution of the next scheduled tasks of the one of the processors to begin without waiting for the VF switch from the current VF level to the next VF level.

2. The method of claim 1, wherein causing the one of the processors to wait for the VF switch from the current VF level to the next VF level prior to enabling execution of the next scheduled tasks of the one of the processors to begin comprises:

causing the one of the processors to wait until the one of the processors detects an occurrence of the timer event.

3. The method of claim 1, wherein the VF level switching process performed by the global power manager comprises:

detecting that all execution processes of the processors are waiting for the VF switch from the current VF level to the next VF level prior to enabling execution of the next scheduled tasks of the one of the processors to begin, and in response to said detection, causing the VF switch from the current VF level to the next scheduled VF level.

4. The method of claim 3, wherein causing the one of the processors to wait for the VF switch from the current VF level to the next VF level prior to enabling execution of the next scheduled tasks of the one of the processors to begin comprises:

notifying the global power manager that the one of the processors is waiting for the VF switch from the current VF level to the next VF level prior to enabling execution of the next scheduled tasks of the one of the processors to begin.

5. The method of claim 1, wherein each one of the next scheduled tasks of the one of the processors begins only when execution of said one of the next scheduled tasks has been enabled and when all task specific dependencies of said one of the next scheduled tasks has been satisfied.

6. The method of claim 5, where the task specific dependencies of said one of the next scheduled tasks comprises task specific data dependencies.

7. An apparatus that controls task execution among a plurality of processors that are configured to operate concurrently at a same global Voltage/Frequency (VF) level, the apparatus comprising:

a global power manager configured to control VF switching from one VF level to another VF level, wherein a same current VF level governs VF settings of each of the processors; and a task execution controller in each one of the processors, each task one of the task execution controllers being configured to control whether the one of the processors will wait for a VF switch from a current VF level to a next VF level prior to enabling execution of a next scheduled task for the one of the processors, wherein:

the global power manager is configured to perform a VF level switching process that comprises:

controlling a timer so as to cause the timer to generate a timer event at a known future time; and whenever the timer event occurs, detecting the timer event and in response to said detection, causing a VF switch from a current VF level to a next scheduled VF level; and each of the task execution controllers is configured to control whether said one of the processors will wait for a VF switch from the current VF level to the next VF level prior to enabling execution of the next scheduled task for the one of the processors by:

detecting that the current VF level is higher than the next scheduled VF level; and responsive to said detecting that the current VF level is higher than the next scheduled VF level, causing the one of the processors to wait for the VF switch from the current VF level to the next VF level prior to enabling execution of the next scheduled tasks of the one of the processors to begin, otherwise enabling execution of the next scheduled tasks of the one of the processors to begin without waiting for the VF switch from the current VF level to the next VF level.

8. The apparatus of claim 7, wherein causing the one of the processors to wait for the VF switch from the current VF level to the next VF level prior to enabling execution of the next scheduled tasks of the one of the processors to begin comprises:

causing the one of the processors to wait until the one of the processors detects an occurrence of the timer event.

9. The apparatus of claim 7, wherein the VF level switching process performed by the global power manager comprises:

detecting that all execution processes of the processors are waiting for the VF switch from the current VF level to the next VF level prior to enabling execution of the next scheduled tasks of the one of the processors to begin, and in response to said detection, causing the VF switch from the current VF level to the next scheduled VF level.

10. The apparatus of claim 9, wherein causing the one of the processors to wait for the VF switch from the current VF level to the next VF level prior to enabling execution of the next scheduled tasks of the one of the processors to begin comprises:
   notifying the global power manager that the one of the processors is waiting for the VF switch from the current VF level to the next VF level prior to enabling execution of the next scheduled tasks of the one of the processors to begin.

11. The apparatus of claim 7, wherein each one of the next scheduled tasks of the one of the processors begins only when execution of said one of the next scheduled tasks has been enabled and when all task specific dependencies of said one of the next scheduled tasks has been satisfied.

12. The apparatus of claim 11, where the task specific dependencies of said one of the next scheduled tasks comprises task specific data dependencies.

* * * * *